May 19, 1931.  J. C. ATWOOD  1,806,552
BROACH

Filed Dec. 10, 1926

Inventor
James C. Atwood
By Blackmore, Spencer & Hirt
Attorneys

Patented May 19, 1931

1,806,552

UNITED STATES PATENT OFFICE

JAMES C. ATWOOD, OF SYRACUSE, NEW YORK, ASSIGNOR TO GENERAL MOTORS CORPORATION, OF DETROIT, MICHIGAN, A CORPORATION OF DELAWARE

BROACH

Application filed December 10, 1926. Serial No. 153,901.

This invention relates to a novel broach.

The first object is to construct a broach of removable parts.

A further object is to construct a broach of removable parts having a definite relation to one another. A further object is to construct a broach of removable parts having an interlocking engagement with one another.

As another object the invention provides for alternately positioned guides and cutting elements. The accompanying drawings will serve to illustrate the broach herein described.

Figure 1:
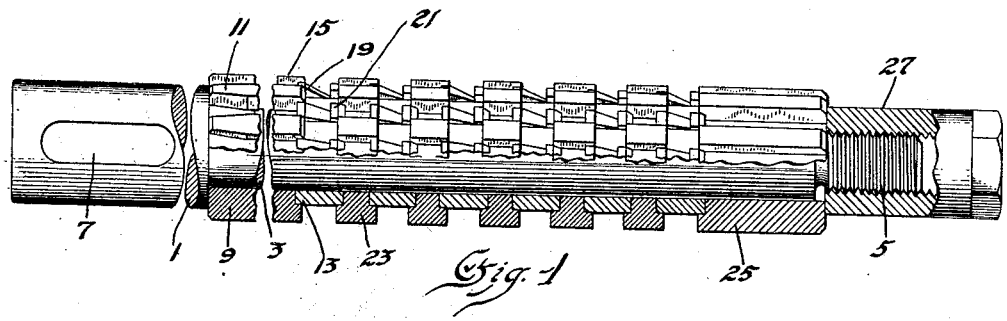
Figure 1 is a side elevation partly in section of the broach.
Figure 2:
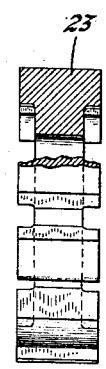
Figure 2 is a side elevation partly in section of one of the guides.

Referring by reference characters to the drawings, numeral 1 is a shank having a reduced part 3, the end portion of which is threaded as at 5. A cross slot 7 is provided for the reception of a pin when the broach is used in a broaching machine. The shank 1 is shown as circular in section, but it will be understood that it may be non-circular as well.

On the reduced portion 3 adjacent the slotted end is a pilot 9. The pilot has an opening corresponding to the shape of and snugly fitting the reduced portion of the shank.

Figure 4:
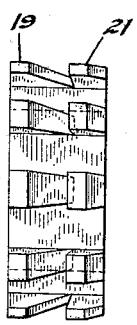
Figure 4 is a side elevation of one of the cutters.
Figure 5:
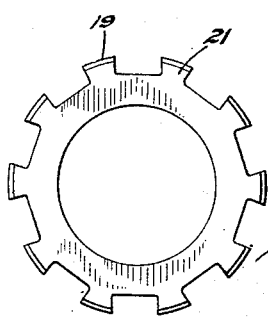
Figure 5 is an end elevation of the same.

At its forward end the pilot is chamfered as at 11 and is of a length sufficient to form an adequate guide for the cutters. The end of the pilot is recessed as at 13 within the portion constituted by the lugs or splines 15. The cutter has a suitable opening, also fitting snugly around the shank. The cutter has splines 19 which engage within the spaces between the splines 15 of the pilot when the cutter is inserted within the recess of the pilot. The splines 19 are cut away on the top toward the center of the cutter, as shown in Figure 4 to form a step for the cutting teeth 21.

Figure 3:
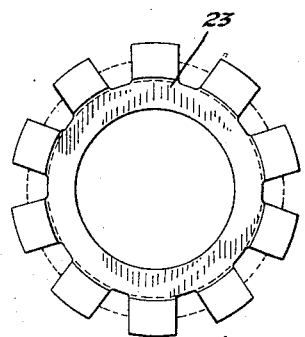
Figure 3 is an end elevation of the guide shown in Figure 2.

Next to the cutter is a guide member 23. This guide has external splines and is recessed on both sides, as shown in Figure 3, the splines and the recess corresponding to the similar parts of the pilot. As shown in Figure 1, the cutting member 21 of the cutter interlocks between the splines of the guide member. The assembly of guides and cutters is continued, as shown in Figure 1, until there are positioned upon the spindle the desired number of cutters, six such cutters being shown. As will be understood by those familiar with the art, the cutter teeth gradually increase in height throughout the tool. After the last cutter is positioned an end guide member 25 is assembled on the shank. The assembly of guides and cutters by means of the interlocking members makes of the whole a substantially solid piece, especially if the openings of the cutters and guides is such as to require a tight fit between these parts and the shank. Finally a nut 27 is threaded on the end portion of the shank and secures the several parts in position.

In operation, the broach is passed through a spline hole, such, for example, as the hole in a gear. The radial splines of the pilot and guides will exactly follow between the splines within the hole. The internal face of the splines within the hole will be cut down and finished to the desired size by the cutting teeth as they pass through. As the broach wears the nut may be removed and the assembly of cutters and guides pressed off the shank. The first cutter may then be separated from the assembly and the following cutters moved up and a new final cutter added, and the parts re-assembled. The cutters may thus be maintained in fixed positions with the desired successive variation in the height of the teeth. A broach made as described will follow an accurate size indefinitely and the spare parts may be made with accuracy. The spare parts must obviously be accurately made to secure the interlocking engagement and the interlock itself is a check on the correctness of the dimensions of the parts.

It will be obvious, too, that if desired, the parts designable as the guides 23 might be made as integral parts of the cutters in which case the interlock would be between successive cutters.

Finally the work of tempering and sharpening the teeth of the cutter elements can be done quickly and accurately.

I claim:

A broach consisting of a shank circular in cross section alternating guides and cutters both having bores circular in cross section and mounted on said shank, the guides having recesses in their end faces and radial splines, the cutters having external teeth, said cutters positioned within adjacent guide recesses and with their teeth engaged between the spline guides.

In testimony whereof I affix my signature.

JAMES C. ATWOOD.